United States Patent Office 3,184,493
Patented May 18, 1965

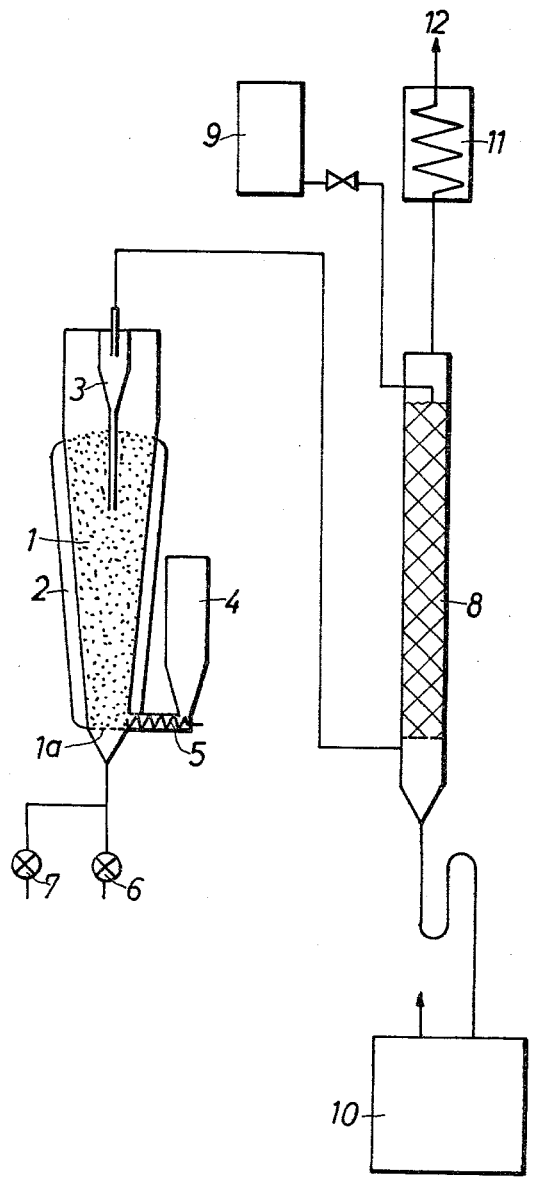

3,184,493
PREPARATION OF POLYISOCYANATES
Heinrich Kunze, Cologne-Stammheim, and Otto Bayer, Julius Wehn, Werner Siefken, and Erich Klauke, Leverkusen, Germany, assignors to Farbenfabriken Bayer Aktiengesellschaft, Leverkusen, Germany, a corporation of Germany
Filed Dec. 11, 1959, Ser. No. 859,022
Claims priority, application Germany, Dec. 19, 1958
F 27,302
4 Claims. (Cl. 260—453)

This invention relates to organic polyisocyanates and more particularly to a method for preparing organic polyisocyanates.

Organic polyisocyanates are becoming more commercially important because polyurethane plastics can be prepared by reacting them with an organic compound having reactive hydrogen atoms determinable by the Zerewitinoff method. The organic polyisocyantes are ordinarily prepared commercially by a process in which an organic polyamine, such as, for example, hexamethylene diamine, toluylene diamine, naphthalene diamine, or the like, is reacted with phosgene to convert the —NH$_2$ groups into —NCO groups. Theoretically, all of the —NH$_2$ should be converted to —NCO groups by such processes, but it has been found in practice that the yield of polyisocyanates is often less than that theoretically possible and that a high molecular weight resinous product remains in the distillation apparatus after the polyisocyanate has been distilled. This residue contains polyureas of relative high molecular weight and up to this time the residue has been scrapped in most instances because no entirely suitable process has been available to recover the amine or to convert the polyureas into polyisocyanates. It has also been proposed to prepare N,N'-diphenyl ureas from aniline and phosgene and to react this mono-urea with additional phosgene to form a dimeric compound having the formula

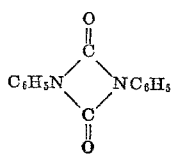

This product is heated to form two mols of phenylene isocyanate per mol of dimer. It has also been proposed to prepare a monoisocyanate by pyrolysis of a trimeric isocyanate but such a process has not met with any large amount of commercial success.

It is an object of this invention to provide a process for preparing an organic polyisocyanate from a polyurea. Another object of the invention is to provide a method for converting polyureas into organic polyisocyanates adapted for use in polyurethane plastics. A still further object of the invention is to provide a novel process for preparing an organic polyisocyanate from polyureas which have been formed during the phosgenation of a polyamine. A more specific object is to provide a novel method for producing organic polyisocyanates having commercial importance.

Other objects will become apparent from the following description with reference to the accompanying drawing illustrating an apparatus suitable for use in one preferred embodiment of the invention.

Generally speaking, the foregoing objects and others which will become apparent from the following description, are accomplished in accordance with this invention by providing a method wherein particles of a polyurea are contacted with phosgene at a temperature between 100° C. and about 300° C. while the particles are suspended in an inert organic liquid having a boiling point above the boiling point of the polyisocyanate resulting from the reaction of the polyurea with phosgene. The organic liquid is a non-solvent for the polyurea and a solvent for the organic polyisocyanate produced. Preferably, the polyurea should have a particle size of from about 60 microns to about 500 microns to insure that the polyurea will be converted into polyisocyanate within a reasonable time. In fact, best results are obtained when the particle size of the polyurea is within the range of from 200 microns to about 500 microns.

In one of the preferred embodiments of the invention, particles of the polyurea having a particle size within the range specified hereinbefore are subjected to a stream of phosgene while the particles are suspended in a fluidized bed of solid inert particles having a temperature of from 100° C. to about 300° C. and preferably within the range of from about 200° C. to about 250° C. This fluidized bed is prepared by fluidizing particles of sea sand, diatomaceous earth, fuller's earth, graphite, kaloin, zinc oxide, calcium carbonate, aluminum silicate, glass beads, or any other inert solid particles with a fluid containing phosgene. The fluid may also contain nitrogen, hydrogen or some other inert gas, or an inert organic liquid which is chemically inactive such as, for example, dinaphthyl, diphenyl and other polyphenyls, dichloro naphthalene, dichloro diphenyl, diphenyl oxide, or a petroleum distillate having a boiling point above the boiling point of the diisocyanate to be produced, diphenyls and triphenyls or the like.

By "fluidized bed" as used herein is meant a suspension of granular solids prepared by flowing a fluid through the bed of particles until the bed expands and the particles become suspended in the fluid. The phenomena of fluidization of solids is described, for example, in the publication, "Unit Operations," by Brown et al., published by John Wiley and Sons, Inc., copyright 1950, beginning on page 269. The granular solid used in preparing the fluidized bed to be used in accordance with this invention, should preferably have a particle size such that substantially all of it will pass through a Standard Tyler 20-mesh screen and remain on a Standard Tyler 60-mesh screen. Best results are obtained with a granular solid which will pass through a Standard Tyler 40-mesh screen and remain on a 60-mesh Standard Tyler screen.

The polyureas contemplated by this invention have at least one and usually several atom groupings

—R—NH—CO—NH—R—NH—CO—NH—R—

The molecular weight of such compounds may be as low as 300 and often will be as high as 50,000 or even higher depending upon the molecular weight of R in the atom grouping. Preferably, the polyureas are applied to the fluidized bed in the form of finely divided unagglomerated particles having the particle size set forth hereinbefore. Preferably, the fluidized bed has been brought to a temperature within the range of from about 100° C. to about 300° C. before the particles of polyureas are added thereto. The phosgenation of the polyureas can be conducted either continuously or by an intermittent batch type process. In the continuous process, the phosgene, polyurea and any other fluid used in maintaining the fluidized bath, are continuously added to the apparatus at a rate which maintains fluidization of the particles and which will insure intimate association of the phosgene and polyurea particles. The organic polyisocyanate and hydrogen chloride formed through reaction of the phosgene with the polyureas are removed substantially as rapidly as they are formed by distillation. The organic polyisocyanate can be washed out of the gas stream passing from the reactor by washing it with a suitable inert organic solvent for the organic polyisocyanate.

In accordance with another preferred embodiment of the invention, particles of polyurea having a particle size within the range specified hereinbefore are suspended in a suitable inert organic liquid which is a non-solvent for the polyurea and a solvent for the polyisocyanate formed during the reaction. The suspension is maintained between a temperature of from about 100° C. to about 300° C. Any suitable organic liquid non-solvent for the polyurea may be used, such as, for example, chlorinated diphenyl, diphenyl oxide, dinaphthyl, any other liquid naphthenic hydrocarbon or chloronation products thereof, diphenyl or other polyphenyls, natural or synthetic mixture of paraffins of the $C_{18}$–$C_{30}$-type and their chlorination products, tetra-hexa isopropylbenzene, tetra-hexa isobutylbenzene, tetra-hexa tert.-butylbenzene, and the like, provided that the boiling point thereof is above the boiling point of the isocyanate produced by the process. After the suspension has been treated with phosgene, excess phosgene can be removed with any hydrogen chloride present by purging the suspension with a suitable inert gas such as, for example, hydrogen, nitrogen, carbon monoxide, carbon dioxide, air, methane, or the like. The polyisocyanate can then be separated from the solution by conventional distillation procedures. After the distillation, the liquid remaining in the reactor can again be used for phosgenation of additional polyurea particles.

The organic polyisocyanate provided by this invention can be used in the preparation of polyurethane plastics by known processes. The resulting polyurethanes may be cellular products or substantially non-porous, rubber-like products which can be used in making upholstery or vehicle tires, respectively.

In order better to describe and further clarify the invention, the following are specific embodiments thereof with reference to the accompanying drawing:

Example 1

A fluidized bed is prepared by placing about 1200 grams of dry sea sand having a particle size of from about 100 microns to about 300 microns in glass tube 1. Glass tube 1 has an internal diameter of about 100 millimeters and a height of about 150 millimeters and is provided at the bottom end thereof with a porous glass plate 1a, such as a frittered glass plate. Electric jacket 2 is provided around tube 1 to heat the contents of the tube to the desired temperature. A cyclone 3 is provided at the top of tube 1 to separate particles carried out of the fluidized bed from the gas containing the polyisocyanate product.

A layer about 200 millimeters thick of fluidized particles of sea sand is obtained by introducing one to two cubic meters per hour of a gas mixture of nitrogen and phosgene (1:1) through controlled feed devices 6 and 7 into the bottom of tube 1. The gas flow rate is such that the particles of the fluidized medium whirl about. The temperature of the contents of the tube is maintained at from about 210° C. to about 240° C. About 50 grams per hour of 2,4-toluylene polyurea and a particle size of from about 200 microns to about 300 microns are continuously transferred from reservoir 4 by means of controlled feed worm 5 into the reaction vessel 1 while it is at the specified temperature.

Gas is formed as the polyurea is contacted by phosgene in the fluidized layer and is removed from tube 1 to scrubbing column 8. This gas is a mixture of nitrogen, hydrogen chloride, phosgene and 2,4-toluylene diisocyanate. In scrubbing column 8, a 2,4-toluylene diisocyanate is separated from the other gases by washing it with an inert solvent therefor such as, for example, o-dichlorobenzene pumped into column 8 from storage tank 9. The effluent from column 8 is transferred to a storage vessel 10 and the waste gases pass from the top of column 8 through reflux conductor 11 and are discharged at 12. The o-dichlorobenzene is separated from 2,4-toluylene diisocyanate in the solution in 10 by a conventional distillation process.

The portion of the residue which is not converted into organic polyisocyanate and remains in the flow medium, can be removed from tube 1 when the concentration thereof reaches the point where it interferes with the fluidization of the sea sand. The removed sea sand can be extracted with a suitable solvent to remove any polyureas or any other residue remaining on the particles thereof before it is returned to tube 1. It has been found that about 850 to 900 grams pure 2,4-toluylene diisocyanate having a boiling point of about 130° C. at 12 millimeters' pressure can be obtained from 1,000 grams of 2,4-toluylene polyurea treated in accordance with this embodiment of the invention.

Example 2

The process of Example 1 is repeated using the same apparatus as described therein and the same processing steps but instead of 2,4-toluylene polyurea about 50 grams of 1,4-phenylene polyurea per hour are treated in tube 1. About 650 grams of pure 1,4-phenylene diisocyanate are obtained from about 780 grams of 1,4-phenylene polyurea.

Example 3

The process of Example 1 is again repeated with about 50 grams of 2,6-toluylene diisocyanate per hour being treated instead of 2,4-toluylene diisocyanate. About 845 grams of 2,6-toluylene diisocyanate are obtained from about 870 grams of 2,6-toluylene polyurea.

Example 4

About 120 parts by weight of polyurea having a particle size of from about 100 microns to about 300 microns prepared from toluylene 2,4-diamine and urea are suspended in about 1,000 parts by weight chlorinated diphenyl, about 20 parts by weight hydrogen chloride are added to the suspension and the temperature is then raised to about 220° C. while it is being stirred vigorously. Phosgene is then added to the suspension at the rate of 150 parts by weight phosgene per hour. After about 1½ hours, a dark, homogeneous solution is formed. Phosgene is added to the solution for an addition 30 minutes at the same rate and at the same temperature as before. Heating is then discontinued and a stream of carbon dioxide is blown through the solution for about 90 minutes at the rate of about 50 liters per hour. During the addition of the carbon dioxide, the temperature is not permitted to fall below from about 120° C. to about 130° C. The solution remaining after the carbon dioxide treatment has an —NCO content of about 5.25 percent which corresponds to a yield of 2,4-toluylene diisocyanate of about 86 percent by weight based on the weight of polyurea used. Connected to the output side of the reaction flask is a second flask in which excess phosgene and hydrogen chloride are washed with refluxing o-dichlorobenzene and in this way small quantities of entrained diisocyanate are stocked. Upon distillation of the solution in o-dichlorobenzene, 102 parts by weight 2,4-toluylene diisocyanate or about 73 percent by weight of the theoretical amount of 2,4-toluylene diisocyanate in the solution can be isolated. The sump phase can be used several times for the same phosgenation.

It is to be understood that the process provided by this invention is applicable to the preparation of various polyisocyanates from polyureas and that any other polyurea can be substituted for those used in the foregoing examples. It is possible, for example, to prepare 1,5-naphthalene diisocyanate, 4,4'-diphenyl methane diisocyanate, 4,4'-diphenyl dimethyl methane diisocyanate, m-phenylene diisocyanate, triphenylmethane triisocyanate, butylene 1,3-diisocyanate, 3,3'-dimethoxy-4,4' biphenylene diisocyanate, hexamethyl diisocyanate, chloro-phenylene diisocyanate, or the like, by the process of this invention from the corresponding polyureas. When the polyurea contains the atom grouping

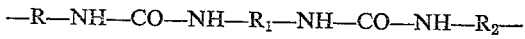
—R—NH—CO—NH—R$_1$—NH—CO—NH—R$_2$— wherein R, R$_1$ and R$_2$ are unlike organic radicals, a mixture of diisocyanate corresponding to each radical will be obtained. For example, in a typical polyurea, R can be a 1,6-hexamethylene radical, R$_1$ can be a 2,4-toluylene radical and R$_2$ can be a 2,6-toluylene radical. With such a polyurea 1,6-hexamethylene diisocyanate, 2,4-toluylene diisocyanate and 2,6-toluylene diisocyanate will be produced.

The polyureas used as starting materials in this invention contain organic radicals joined by the atom grouping

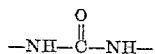

and contain at least two of the latter groupings. It is preferred that the polyurea consist of the atom grouping RNH—CO—NH(—R$_1$—NH—CO—NH)$_n$R where R is an organic radical either aromatic, cycloaliphatic, alicyclic or heterocyclic either unsubstituted or substituted such as with an alkyl, alkoxy, halogen such as chlorine or nitro-substituent, or the like and R$_1$ is a divalent aromatic, cyclophatic, alicyclic or heterocyclic radical. The alkyl groups can be methyl, ethyl, propyl, octyl, or the like. The alkoxy groups can be methoxy, ethoxy, butoxy, or the like; $n$ may be any integer of 1 or more. However, the polyurea might contain some other linkages such as, urethane, biuret, allophanate and the like in addition to a plurality of urea links.

Although the invention has been described in considerable detail in the foregoing, it is to be understood that such detail is solely for the purpose of illustration and that variations can be made by those skilled in the art without departing from the spirit and scope of the invention except as set forth in the claims.

What is claimed is:
1. A method for converting a polyurea having a molecular weight of from about 300 to 50,000 into an organic polyisocyanate which comprises suspending particles of the polyurea having a particle size of from about 60 microns to about 500 microns in a fluidized bed of inert particles suspended in a gas containing phosgene at a temperature of about 100° C. to about 300° C. whereby a gas containing an organic polyisocyanate is obtained, and separating the polyisocyanate therefrom by washing the gas with an inert organic solvent for the polyisocyanate which is a non-solvent for the remainder of the gas.
2. The process of claim 1 wherein the fluidized bed contains particles of sand.
3. The method of claim 1 wherein the polyisocyanate is toluylene diisocyanate.
4. The process of claim 1 wherein the polyisocyanate is hexamethylene diisocyanate.

References Cited in the file of this patent

UNITED STATES PATENTS 2,689,861  Thompson _____ Sept. 21, 1954

FOREIGN PATENTS 946,138  Germany _____ July 26, 1956

OTHER REFERENCES

Shingu et al., Chemical Abstracts, vol. 51, page 10403 (1957).
Siefken et al., Ann., vol. 562, pages 75–136 (1949).
Pinner, Plastics (London), vol. 11, pages 206–9 (1947).
Degering, "Outline of Organic Nitrogen Compounds," page 544, University of Lithoprinters, Ypsilanti, Michigan (1950).